United States Patent [19]

Occelli

[11] Patent Number: 5,053,213

[45] Date of Patent: Oct. 1, 1991

[54] PROCESS FOR SYNTHESIZING A MOLECULAR SIEVE HAVING THE FAUJASITE STRUCTURE AND CONTAINING ALUMINUM AND GALLIUM

[75] Inventor: Mario L. Occelli, Yorba Linda, Calif.

[73] Assignee: Union Oil Company of California, Los Angeles, Calif.

[21] Appl. No.: 398,770

[22] Filed: Aug. 25, 1989

[51] Int. Cl.$^5$ .......................................... C01B 33/26
[52] U.S. Cl. ....................................... 423/328; 423/118
[58] Field of Search ................. 423/328 C, 326, 118

[56] References Cited

U.S. PATENT DOCUMENTS

| | | | |
|---|---|---|---|
| 3,431,219 | 3/1969 | Argauer | 502/61 |
| 4,178,352 | 12/1979 | Vaughan et al. | 423/329 |
| 4,340,573 | 7/1982 | Vaughan et al. | 423/328 |
| 4,608,236 | 8/1986 | Strack et al. | 423/118 |
| 4,678,651 | 7/1987 | Miyazaki et al. | 423/329 |
| 4,803,060 | 2/1989 | Occelli | 423/326 |
| 4,925,613 | 5/1990 | Harada et al. | 423/118 |

OTHER PUBLICATIONS

J. Selbin and R. B. Mason, "Preparation of Gallium-Containing Molecular Sieves", *J. Inorg. Nucl. Chem.*, vol. 20, 1961, pp 222-228.

K. Suzuki, Y. Kiyozumi, S. Shin and S. Ueda, "Synthesis of New Galliosilicate Zeolite with Sodalite Structure", *Zeolites*, vol. 5, 1985, pp. 11-14.

J. M. Newsam, D. E. W. Vaughan, "Structural Studies of Galliosilicate Zeolites", *New Developments in Zeolite Scence and Technology*, Proceedings of the 7th International Zeolite Conference, Tokyo, 1986, pp. 457-464.

D. E. W. Vaughan, M. T. Melchior and A. J. Jacobson, "High Resolution Silicon-29 NMR Studies of Gallium Faujasites and a Gallium Sodalite", *Intrazeolite Chemistry*, ACS Symposium Series 218, 1983, pp. 231-242.

*Primary Examiner*—Gary P. Straub
*Assistant Examiner*—Stuart L. Hendrickson
*Attorney, Agent, or Firm*—Yale S. Finkle; Gregory F. Wirzbicki

[57] ABSTRACT

A crystalline, gallioaluminosilicate molecular sieve having the faujasite structure is synthesized by mixing a substantially gallia-free aluminosilicate hydrogel with a galliosilicate solution substantially free of alumina to form a mixture having the following oxide mole ratios of components $$SiO_2/(Al_2O_3+Ga_2O_3) = 5 \text{ to } 30$$

$$Na_2O/(Al_2O_3+Ga_2O_3) = 1 \text{ to } 5$$

$$H_2O/(Al_2O_3+Ga_2O_3) = 50 \text{ to } 300$$

and then crystallizing the resultant mixture, usually in 3 days or less, under relatively quiescent conditions.

28 Claims, 3 Drawing Sheets

PROCESS FOR SYNTHESIZING A MOLECULAR SIEVE HAVING THE FAUJASITE STRUCTURE AND CONTAINING ALUMINUM AND GALLIUM

BACKGROUND OF THE INVENTION

This invention relates to crystalline molecular sieves containing both aluminum and gallium, and is particularly concerned with a method for synthesizing a crystalline gallioaluminosilicate molecular sieve having the faujasite structure.

Zeolites are well known natural and synthetic molecular sieves that can be defined as crystalline, three-dimensional aluminosilicates consisting essentially of alumina and silica tetrahedra which interlock to form discrete polyhedra. The polyhedra are interconnected to form a framework which encloses cavities or voids interconnected by channels or pores. The size of the cavities and pores will vary depending on the framework structure of the particular zeolite. Normally, the cavities are large enough to accommodate water molecules and large cations which have considerable freedom of movement, thereby permitting sorption, reversible dehydration and ion exchange. The dimensions of the cavities and pores in a zeolite are limited to a small number of values and can vary from structure to structure. Thus, a particular zeolite is capable of sorbing molecules of certain dimensions while rejecting those of dimensions larger than the pore size associated with the zeolite structure. Because of this property zeolites are commonly used as molecular sieves.

In addition to their molecular sieving properties, zeolites show a pronounced selectivity toward polar molecules and molecules with high quadrupole moments. This is due to the ionic nature of the crystals which gives rise to a high nonuniform electric field within the micropores of the zeolite. Molecules which can interact energetically with this field, such as polar or quadrupolar molecules, are therefore sorbed more strongly than nonpolar molecules. This selectivity toward polar molecules is the unique property of zeolites which allows them to be used as drying agents and selective sorbents.

In addition to their use as drying agents and selective sorbents, zeolites are widely used as components of chemical conversion catalysts. As found in nature or as synthesized, zeolites are typically inactive because they lack acid sites. In general, acid sites are created by subjecting the zeolite to an ion exchange with ammonium ions followed by some type of thermal treatment which creates acid sites by decomposing the ammonium ions into gaseous ammonia and protons. Activated zeolites have been used in many types of chemical conversion processes with the smaller pore zeolites being used to selectively sorb and crack normal and moderately branched chain paraffins.

Because of the unique properties of zeolitic molecular sieves, there have been many attempts at synthesizing new molecular sieves by either substituting an element for the aluminum or silicon present in zeolitic molecular sieves or adding another element in addition to the aluminum and silicon. The term "zeolitic" as used herein refers to molecular sieves whose frameworks are formed of substantially only silicon and aluminum in tetrahedral coordination with oxygen. One such class of new molecular sieves that has been created is that in which a portion of the framework aluminum has been replaced by gallium. Specifically, it has been reported in U.S. Pat. No. 3,431,219 that gallioaluminosilicate molecular sieves having the faujasite structure have been synthesized. The synthesis process, as illustrated in Example 3 of the patent, involves the separate preparation of a colloidal silica solution and a solution comprised of a mixture of gallium hydroxide dissolved in aqueous sodium hydroxide and sodium aluminate dissolved in water. According to the example, the silica solution was added to the other solution with rapid stirring and the resultant gel maintained at room temperature overnight and then heated to 200° F. Although some crystalline material was present after 6 days, crystallization was not complete until 12 days had past. Such long crystallization times are impractical, and it is therefore clear that a simple process utilizing inexpensive reactants to more rapidly produce gallioaluminosilicate molecular sieves with the faujasite structure is desirable.

Accordingly, it is one of the objects of the present invention to provide a relatively simple and rapid process for synthesizing crystalline, gallioaluminosilicate molecular sieves having the faujasite structure, which sieves may be useful in many types of chemical conversion processes, particularly hydrocarbon conversion processes. This and other objects of the invention will become more apparent in view of the following description of the invention.

SUMMARY OF THE INVENTION

In accordance with the invention, it has now been found that a crystalline, gallioaluminosilicate molecular sieve comprising silicon, aluminum, gallium and oxygen and having the faujasite crystal structure can be synthesized by mixing a source of alumina, a source of silica, a source of sodium and water to form a hydrogel substantially free of gallia in which the components have the following oxide mole ratios:

$SiO_2/Al_2O_3 = 6$ to $15$ $Na_2O/Al_2O_3 = 1$ to $5$ $H_2O/Al_2O_3 = 80$ to $500$

After the above-described hydrogel is formed, it is mixed with a galliosilicate solution substantially free of alumina prepared by mixing a source of gallia, a source of silica, a source of sodium and water. The mole ratio of $Na_2O$-to-$Ga_2O_3$ in the galliosilicate solution is sufficiently large to prevent gel formation, or, if a gel does form, to facilitate dissolution of the gel upon vigorous stirring. The components comprising the solution are typically present in the following oxide mole ratios:

$SiO_2/Ga_2O_3 = 5$ to $30$ $Na_2O/Ga_2O_3 = 6$ to $20$ $H_2O/Ga_2O_3 = 200$ to $800$

After the alumina-free solution is added to the gallia-free aluminosilicate hydrogel, the mixture is crystallized, normally without substantial agitation and at a temperature below about 250° C., preferably below 150° C., to form a crystalline, gallioaluminosilicate molecular sieve having the faujasite structure. This molecular sieve typically has the composition, expressed in terms of oxide mole ratios in the anhydrous state, of:

$aAl_2O_3: bGa_2O_3: cSiO_2: dNa_2O$ where a equals 0.5 to 0.99, b equals 0.01 to 0.5, c equals 2.0 to 10, d equals about 1.0 and a+b equals 1.0.

DETAILED DESCRIPTION OF THE INVENTION

Figure 1:
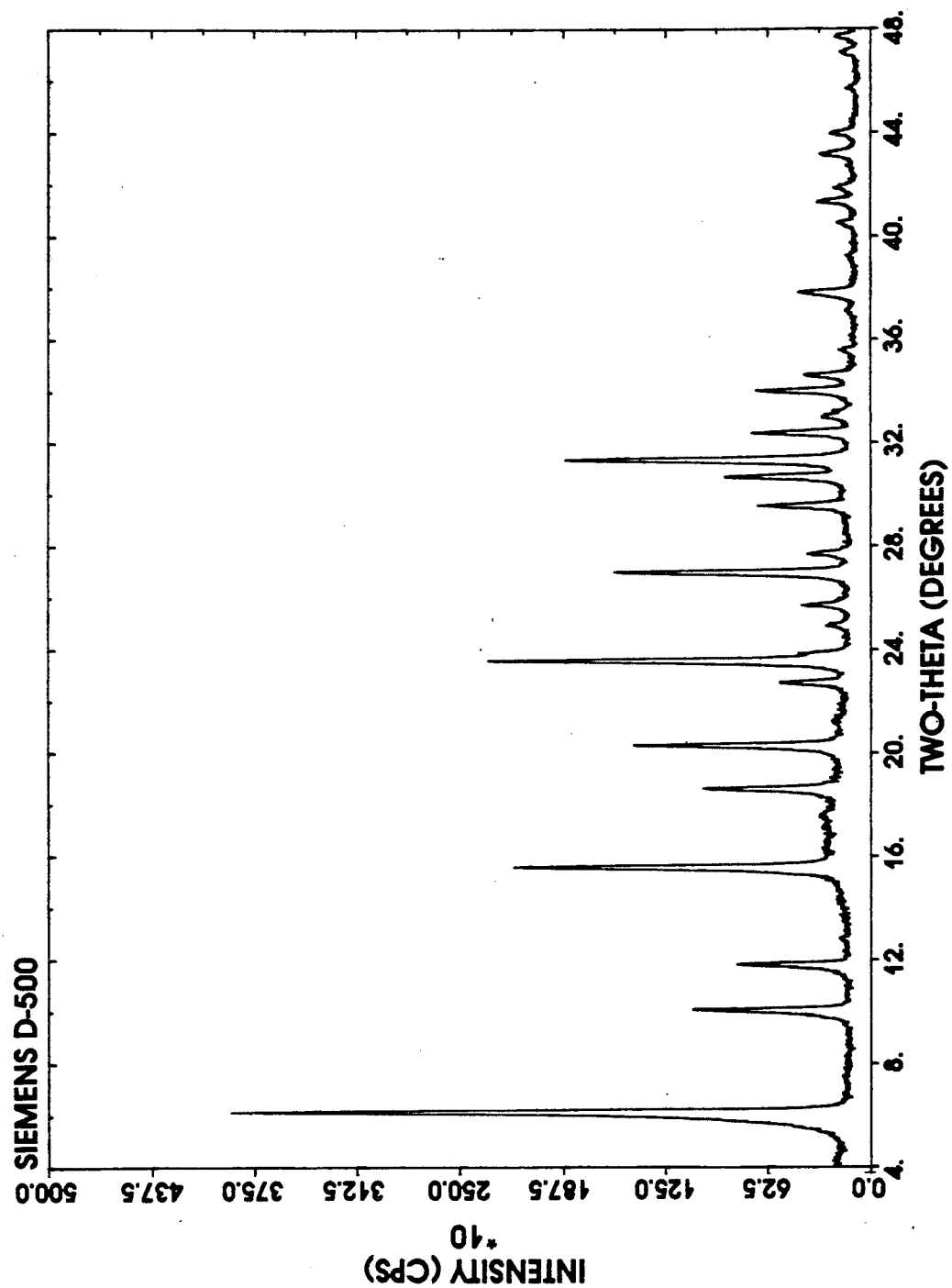
FIG. 1 in the drawing shows the X-ray powder diffraction pattern of a zeolite with the faujasite structure.

A crystalline, gallioaluminosilicate molecular sieve having the faujasite structure is prepared by crystallizing a mixture of an aluminosilicate hydrogel and a galliosilicate solution essentially free of alumina and particulates. Both the hydrogel and the solution are separately formed by mixing either a source of alumina or a source of gallia, a source of silica, and a source of sodium with water under conditions such that the various components react to form, respectively, the desired hydrogel and the desired solution. The crystallization is carried out in the absence of an organic templating or directing agent. The gallioaluminosilicate molecular sieve formed upon crystallization will normally contain between about 10 weight percent and about 35 weight percent alumina, preferably between about 15 and 25 weight percent, and between about 0.1 weight percent and about 15 weight percent gallia, preferably between about 1.0 and 5.0 weight percent.

The silica used in forming the aluminosilicate hydrogel and galliosilicate solution may be in the form of sodium silicate, silica hydrosols, silica gels, silica salts, silicic acid sols, silicic acid gels, aerosils, organic silica salts such as tetramethylammonium silicate and methyltriethoxysilane, and reactive amorphous solid silicas. The source of the silica can be in either the liquid or solid state. Examples of reactive, amorphous solid silicas that may be used include fumed silicas, chemically precipitated silicas, and precipitated silica sols usually having a particle size of less than 1 micron in diameter. The preferable sources of silica are sodium silicates (water glass) and aqueous colloidal solutions of silica particles.

The alumina used to produce the aluminosilicate hydrogel may be in the form of aluminum oxide with or without waters of hydration, aluminum hydroxide, an inorganic aluminum salt such as aluminum nitrate, sulfate, chloride or acetate, sodium aluminate and aluminum alkoxydes. The use of sodium aluminate is normally preferred.

The source of sodium used in forming the aluminosilicate hydrogel and the galliosilicate solution may be a sodium salt or sodium hydroxide. It is possible for the source of sodium used to prepare the galliosilicate solution to also be the source of gallia utilized to form the solution. Sodium gallates are examples of materials which serve as a source of both sodium and gallia.

The gallia used to produce the galliosilicate solution may be in the form of gallium oxide, gallium hydroxide, an alkali metal gallate or an inorganic gallium salt, such as gallium nitrate, gallium sulfate, and gallium acetate. As mentioned above, the source of the gallia may also be the source of sodium required to form the galliosilicate solution. In fact, a preferred source of gallia is prepared by dissolving gallium oxide in an aqueous solution of sodium hydroxide to form sodium gallate which is then used as a component to form the galliosilicate solution.

The aluminosilicate hydrogel used to form the mixture from which a gallioaluminosilicate molecular sieve with the faujasite structure is crystallized is normally prepared by first dissolving the source of alumina in an aqueous solution of sodium hydroxide. The resulting solution is then mixed with a source of silica to form a hydrogel which is vigorously stirred. A sufficient amount of the alumina source, the silica source, the sodium source and water is used so that the resultant hydrogel contains the following oxide mole ratios of components:

$SiO_2/Al_2O_3 = 6$ to 15, preferably 8 to 12

$Na_2O/Al_2O_3 = 1$ to 5, preferably 2.5 to 4.5

$H_2O/Al_2O_3 = 80$ to 500, preferably 100 to 200

The galliosilicate solution that is added to the hydrogel to form the crystallization mixture is substantially free of alumina and dispersed particles and is typically prepared by dissolving a source of gallia in aqueous sodium hydroxide and mixing the resulting solution with a silica source. A sufficient amount of the gallia source, the silica source, the sodium source and water is used so that the resultant mixture contains the following oxide mole ratios of components:

$SiO_2/Ga_2O_3 = 5$ to 30, preferably 10 to 20

$Na_2O/Ga_2O_3 = 6$ to 20, preferably 8 to 15

$H_2O/Ga_2O_3 = 200$ to 800, preferably 300 to 500

Generally, a sufficient amount of the sodium source is used so that the $Na_2O/Ga_2O_3$ ratio is such that a gel is not formed when the components are mixed together or, if a gel is formed upon the mixing of the components, it can be forced into solution by stirring at ambient temperature.

After the aluminosilicate hydrogel and the galliosilicate solution have been separately prepared, a sufficient amount of the solution is added to the hydrogel so that the resultant mixture, which remains in a gel form, contains between about 1 and about 40 weight percent of the solution, preferably between about 10 and about 30 weight percent. Normally, the oxide mole ratio of components in the resultant mixture will fall within the following ranges:

$SiO_2/(Ga_2O_3+Al_2O_3) = 5$ to 30, preferably 8 to 16

$Na_2O/(Ga_2O_3+Al_2O_3) = 1$ to 5, preferably 2 to 4

$H_2O/(Ga_2O_3+Al_2O_3) = 50$ to 500, preferably 100 to 200

The mixture is then stirred at atmospheric pressure and preferably at about ambient temperature for from about 1 hour to about 2 days, preferably between about 1 hour and about 10 hours. After stirring, the mixture is crystallized by heating in the absence of substantial stirring or agitation for between about 1 day and 5 days, usually in 3 days or less, at a temperature in the range between about 70° C. and 150° C., preferably between about 90° C. and 110° C. The temperature is normally controlled within the above ranges while avoiding substantial agitation in order to prevent the formation of phase impurities. After the mixture has been crystallized, the resulting slurry is passed to a filter, centrifuge or other separation device to remove the excess reactants or mother liquor from the crystallized molecular sieve. The crystals are then washed with water and dried at a temperature between about 50° C. and about 200° C. to remove surface water.

The dried crystals produced as described above will normally have the following composition expressed in terms of oxide mole ratios in the anhydrous state:

$$aAl_2O_3: bGa_2O_3: cSiO_2: dNa_2O$$

where a equals 0.5 to 0.99, b equals 0.01 to 0.5, c equals 2.0 to 10, preferably 3 to 7, d equals about 1.0 and a+b equals 1.0. The X-ray powder diffraction pattern of the crystallized molecular sieve will typically contain at least the d-spacings set forth in Table 1 below.

TABLE 1

| Bragg Angle 2-Theta (Degrees) | Interplanar d-spacings (Angstroms) | Relative Intensity (100 × $I/I_o$) |
|---|---|---|
| 5.9–6.4 | 14.967–13.799 | 80–100 |
| 15.4–15.9 | 5.7488–5.5691 | 30–70 |
| 23.3–24.0 | 3.8144–3.7047 | 30–80 |
| 26.7–27.4 | 3.3359–3.2522 | 20–50 |
| 31.0–31.8 | 2.8823–2.8139 | 30–70 |
| 33.7–34.4 | 2.6573–2.6069 | 5–30 |

The X-ray powder diffraction data set forth in Table 1 is characteristic of a molecular sieve having the faujasite structure. For comparison purposes, the X-ray powder diffraction pattern of a synthetic zeolite with the faujasite structure is shown in FIG. 1, and the corresponding X-ray powder diffraction data are set forth in Table 2.

TABLE 2

X-Ray-Powder Diffraction Data for a Synthetic Zeolite with the Faujasite Structure

| Bragg Angle 2-Theta (Degrees) | Interplanar d-spacings (Angstroms) | Relative Intensity (100 × $I/I_o$) |
|---|---|---|
| 6.143 | 14.3764 | 100.0 |
| 10.077 | 8.7705 | 25.4 |
| 11.836 | 7.4707 | 18.2 |
| 14.434 | 6.1318 | 1.1 |
| 15.600 | 5.6759 | 52.3 |
| 18.638 | 4.7571 | 21.7 |
| 20.316 | 4.3677 | 33.6 |
| 21.110 | 4.2052 | 1.7 |
| 22.746 | 3.9063 | 10.5 |
| 23.595 | 3.7676 | 57.0 |
| 24.950 | 3.5660 | 3.7 |
| 25.734 | 3.4591 | 7.5 |
| 26.990 | 3.3009 | 37.2 |
| 27.720 | 3.2156 | 6.4 |
| 29.576 | 3.0179 | 14.3 |
| 30.695 | 2.9104 | 17.9 |
| 31.338 | 2.8521 | 44.6 |
| 32.397 | 2.7612 | 15.6 |
| 33.032 | 2.7096 | 4.4 |
| 34.035 | 2.6320 | 14.6 |
| 34.627 | 2.5884 | 7.4 |
| 35.582 | 2.5211 | 2.9 |
| 37.123 | 2.4199 | 1.6 |
| 37.822 | 2.3768 | 9.1 |
| 39.244 | 2.2939 | 1.4 |
| 40.503 | 2.2254 | 3.2 |
| 41.346 | 2.1819 | 5.7 |
| 41.860 | 2.1563 | 3.0 |
| 43.175 | 2.0936 | 5.4 |
| 43.971 | 2.0576 | 4.0 |
| 45.726 | 1.9826 | 1.8 |
| 47.096 | 1.9281 | 2.6 |

The X-ray powder diffraction data set forth in Table 1 for the crystallized gallioaluminosilicate produced in accordance with the process of the invention are based on data obtained using a Siemens D-500 X-ray diffractometer with graphite-crystal monochromatized Cu-K alpha radiation. The peak heights I, and their position as a function of 2-theta, where theta is the Bragg angle, were read from the diffractometer output. From this output the relative intensities, $100 \times I/I_o$, where $I_o$ is the intensity of the strongest peak, were read. The interplanar spacings, d, in Angstroms corresponding to the recorded peaks were then calculated in accordance with standard procedures. It will be understood that the peak heights and d-spacings associated with the X-ray powder diffraction pattern of the gallioaluminosilicate molecular sieve may vary somewhat depending on various factors, e.g., heat treatment, unit cell composition, crystal size, and whether the molecular sieve has been exchanged with hydrogen ions or metal cations.

After the synthesized gallioaluminosilicate crystals have been washed and dried, they are typically treated in order to render them active for acid catalyzed reactions. This procedure normally comprises exchanging the molecular sieve with ammonium ions, hydrogen ions, polyvalent cations such as rare earth-containing cations, magnesium cations or calcium cations, or a combination of ammonium ions, hydrogen ions, and polyvalent cations, thereby lowering the sodium content to below about 2.0 weight percent, preferably below about 1.0 weight percent and most preferably below about 0.05 weight percent, calculated as $Na_2O$. When reducing the sodium content using an ammonium ion exchange technique, the molecular sieve is typically slurried for 1 to 5 hours at a temperature above ambient temperature but less than about 100° C. in an aqueous solution containing a dissolved ammonium salt, such as ammonium nitrate, ammonium sulfate, ammonium chloride and the like. Ordinarily, to achieve extremely low levels of sodium cations, the ion exchange procedure will be repeated at least twice, and occasionally several times. After the ammonium exchange or other treatment to reduce alkali metal content, the molecular sieve is calcined in air at a temperature between about 400° C. and about 700° C., preferably between about 500° C. and about 600° C., for between about 5 hours and about 15 hours. Calcination after an ammonium exchange serves to decompose the ammonium cations into ammonia, which is driven off during the calcination step, and thereby produce the catalytically active hydrogen form of the gallioaluminosilicate molecular sieve.

A crystalline, gallioaluminosilicate molecular sieve having the faujasite structure produced in accordance with the process of the invention may be used as a component of a catalyst for converting hydrocarbons and other organic compounds into more valuable reaction products by acid catalyzed reactions, such as alkylation, transalkylation, dealkylation, isomerization, dehydrocyclization, dehydrogenation, hydrogenation, cracking, hydrocracking, dewaxing, hydrodewaxing, oligomerization, aromatization, alcohol conversion reactions, the conversion of syngas to mixtures of hydrocarbons and the like. In utilizing such a gallioaluminosilicate as a catalyst component in conversion processes as described above, it will normally be combined with a porous, amorphous, inorganic refractory oxide component, or a precursor thereof, such as alumina, silica, titania, magnesia, zirconia, beryllia, silica-alumina, silica-magnesia, silicatitania, a dispersion of silica-alumina in gamma alumina, a clay such as kaolin, hectorite, sepiolite or attapulgite, combinations of the above and the like. The preferred porous, inorganic refractory oxide component will depend upon the particular conversion process involved and will be well known to those skilled in the art. Examples of precursors that may be used include peptized alumina, alumina gel, hydrated alumina, silica-alumina gels, Ziegler-derived aluminas and silica sols. The exact amounts of crystalline gallioaluminosilicate and porous, inorganic refractory oxide used in the catalyst will again depend upon the particular conversion process in which the catalyst is to be used.

It will be understood that, although the primary use of the catalyst will be in hydrocarbon conversion processes to convert hydrocarbon feedstocks into desirable reaction products, the catalyst can also be used to convert feedstocks or organic compounds other than hydrocarbons into desired reaction products. For example, the catalyst can be used to convert alcohols into transportation fuels and to convert gaseous mixtures of carbon monoxide and hydrogen into hydrocarbons.

Depending on the particular type of conversion process in which the catalyst containing a gallioaluminosilicate molecular sieve with the faujasite structure is to be used, it may be desirable that the catalyst also contain a metal promoter or combination of metal promoters selected from Group IB, Group IIB, Group IIIA, Group IVA, Group VA, Group VIB, Group VIIB or Group VIII of the Periodic Table of Elements. As used herein "Periodic Table of Elements" refers to the version found in the inside front cover of the "Handbook of Chemistry and Physics," 65th Edition, published in 1984 by the Chemical Rubber Company, Cleveland, Ohio. Specific metal components which may be used as promoters include components of copper, silver, zinc, aluminum, gallium, indium, thallium, lead, tin, antimony, bismuth, chromium, molybdenum, tungsten, manganese, iron, cobalt, nickel, ruthenium, rhodium, palladium, iridium, platinum, rhenium, thorium and the rare earths. These metal promoters may be ion exchanged into the crystalline gallioaluminosilicate itself, they may be incorporated into the mixture of the crystalline gallioaluminosilicate and the porous, inorganic refractory oxide, or they may be added by impregnation after the catalyst particles have been formed.

The catalyst is normally prepared by mulling a crystalline gallioaluminosilicate molecular sieve produced in accordance with the process of the invention in powder form with the porous, inorganic refractory oxide component. If desired, a binder such as peptized Catapal alumina may be incorporated into the mulling mixture, as also may one or more active promoter metal precursors. After mulling, the mixture is extruded through a die having openings of a cross sectional size and shape desired in the final catalyst particles. For example, the die may have circular openings to produce cylindrical extrudates, openings in the shape of three-leaf clovers so as to produce an extrudate material similar to that shown in FIGS. 8 and 8A of U.S. Pat. No. 4,028,227, the disclosure of which is hereby incorporated by reference in its entirety, or openings in the shape of four leaf clovers. Among preferred shapes for the die openings are those that result in particles having surface-to-volume ratios greater than about 100 reciprocal inches. If the die opening is not circular in shape, it is normally desirable that the opening be in a shape such that the surface-to-volume ratio of the extruded particles is greater than that of a cylinder. After extrusion, the catalyst particles are broken into lengths of from 1/16 to ½ inch and calcined in air at a temperature of at least 750° F., usually between about 800° F. and about 1200° F., and preferably in the range between about 900° F. and 1050° F.

As mentioned previously, metal promoter components may be mulled, either as a solid or liquid, with a gallioaluminosilicate prepared in accordance with the process of the invention and the porous, inorganic refractory oxide component or precursor thereof to form the catalyst extrudates prior to the calcination step. Alternatively, the metal promoter component or components may be added to the catalyst by impregnation after the calcination step. The metal promoter component or components may be impregnated into the calcined extrudates from a liquid solution containing the desired metal promoter component or components in dissolved form. In some cases, it may be desirable to ion exchange the calcined extrudates with ammonium ions prior to adding the metal promoter component or components. After the calcined extrudates have been impregnated with the solution containing the metal promoter component or components, the particles are dried and calcined in air at a temperature normally ranging between about 800° F. and about 1100° F. to produce the finished catalyst particles.

In addition to a crystalline, gallioaluminosilicate molecular sieve having the faujasite structure, the catalyst may also contain other molecular sieves such as aluminosilicates, borosilicates, aluminophosphates, silicoaluminophosphates, naturally occurring zeolites, pillared clays and delaminated clays. Suitable aluminosilicates for combining with a crystalline gallioaluminosilicate include Y zeolites, ultrastable Y zeolites, X zeolites, zeolite beta, zeolite L, faujasite and zeolite omega. The actual molecular sieve used in combination with a crystalline gallioaluminosilicate will depend upon the particular conversion process in which the resultant catalyst is to be used. The molecular sieve of choice is normally incorporated into the catalyst by mixing the molecular sieve with a crystalline gallioaluminosilicate and porous, inorganic refractory oxide prior to mulling and extrusion.

It is typically preferred to use catalysts containing a crystalline gallioaluminosilicate molecular sieve synthesized in accordance with the process of the invention as a cracking catalyst in the absence of added hydrogen or in hydroconversion processes such as hydrodenitrogenation, hydrodesulfurization, hydrocracking and isomerization. When used in hydroconversion processes, the catalyst will normally contain hydrogenation components comprising metals selected from Group VIII and/or Group VIB of the Periodic Table of Elements. These hydrogenation metal components are incorporated into the catalyst extrudates either prior to or after extrusion. Examples of Group VIII and Group VIB metal components that may be used include nickel, cobalt, tungsten, molybdenum, palladium and platinum components. In some cases, it may be desirable that the catalyst contain at least one Group VIII metal component and at least one Group VIB metal component. When this is the case, the preferred combination is a nickel and/or cobalt component with a molybdenum and/or tungsten component.

If the hydrogenation metal component consists essentially of one or more noble metals such as platinum or palladium or compounds thereof, it is generally desired that the finished catalyst particles contain between about 0.05 and about 10 weight percent of the hydrogenation metal component, preferably between about 0.10 weight percent and about 3.0 weight percent, calculated as the metal. If on the other hand, the hydrogenation metal component consists essentially of one or more non-noble metals, such as nickel or nickel and tungsten or compounds thereof, it is normally desired that the finished catalyst particles contain between about 1.0 and about 40 weight percent of the hydrogenation metal components, preferably between about 3 weight percent and about 30 weight percent, calculated as the metal oxide.

Feedstocks that may be subjected to hydroconversion processes using a catalyst containing a gallioaluminosilicate synthesized in accordance with the process of the invention include mineral oils, synthetic oils, such as shale oil, oil derived from tar sands and coal liquids, and the like. Examples of appropriate feedstocks for hydroconversion processes include straight run gas oils, vacuum gas oils and catalytic cracker distillates. Preferred hydroconversion feedstocks include gas oils and other hydrocarbon fractions having at least about 50 weight percent of their components boiling above about 700° F.

In general, the temperature at which the hydroconversion process takes place is between about 450° F. and about 850° F., preferably between about 600° F. and about 800° F. The pressure will normally range between about 750 and about 3500 p.s.i.g., preferably between about 1000 and about 3000 p.s.i.g. The liquid hourly space velocity (LHSV) is typically between about 0.3 and about 5.0 reciprocal hours, preferably between about 0.5 and about 3.0. The ratio of hydrogen gas to feedstock utilized will usually range between about 1000 and about 10,000 scf/bbl, preferably between about 2000 and about 8000 scf/bbl as measured at 60° F. and one atmosphere.

The nature and objects of the invention are further illustrated by the following examples, which are provided for illustrative purposes only and not to limit the invention as defined by claims. The examples demonstrate a simple and rapid method of synthesizing a crystalline gallioaluminosilicate with the faujasite structure and illustrate the importance of avoiding substantial agitation during crystallization.

EXAMPLE 1

A sodium gallate solution is prepared by mixing in a glass beaker gallium oxide of a 99.99% purity with an aqueous solution of sodium hydroxide made by dissolving commercial grade sodium hydroxide crystals in distilled water. The mixture of gallium oxide and sodium hydroxide is vigorously stirred under boiling conditions until the gallium oxide is completely dissolved. After stirring, Ludox HS-40, a silica sol solution manufactured and sold by the DuPont Chemical Company, is added dropwise to the stirred mixture to form a hydrogel. The resultant hydrogel is stirred at room temperature until the gel passes into solution generating a clear liquid galliosilicate solution free of dispersed particles and having the following composition expressed in terms of oxide mole ratios:

$$Ga_2O_3:15\ SiO_2:10\ Na_2O:400\ H_2O$$

In a second glass beaker, Ludox HS-40 silica sol solution is added dropwise to a strongly alkaline, aqueous sodium aluminate solution to form a hydrogel with the following composition expressed in terms of oxide mole ratios:

$$Al_2O_3:11.1\ SiO_2:\ 4.44\ Na_2O:167\ H_2O$$

After the aluminosilicate hydrogel is formed, a sufficient amount of the galliosilicate solution prepared in the first container is added to the second container so that the resultant mixture has the following composition expressed in terms of oxide mole ratios:

$$0.9\ Al_2O_3:0.1\ Ga_2O_3:10\ SiO_2:\ 4.0\ Na_2O:150\ H_2O$$

The mixture of the aluminosilicate hydrogel and the galliosilicate solution, which is itself a gel, is then stirred at ambient temperature for about 2 hours after which the temperature is slowly raised to between about 95° C. to 100° C. At this point stirring is terminated, and the mixture is allowed to crystallize without stirring or agitation. After about 48 hours the hydrogel is transformed into a crystalline material. The resulting crystals are washed with hot distilled water to remove excess reactants and then dried. The dried crystals have the following composition expressed in terms of oxide mole ratios in the anhydrous state:

$$0.92\ Al_2O_3:0.08\ Ga_2O_3:5.5\ SiO_2:0.99\ Na_2O$$

Figure 2:
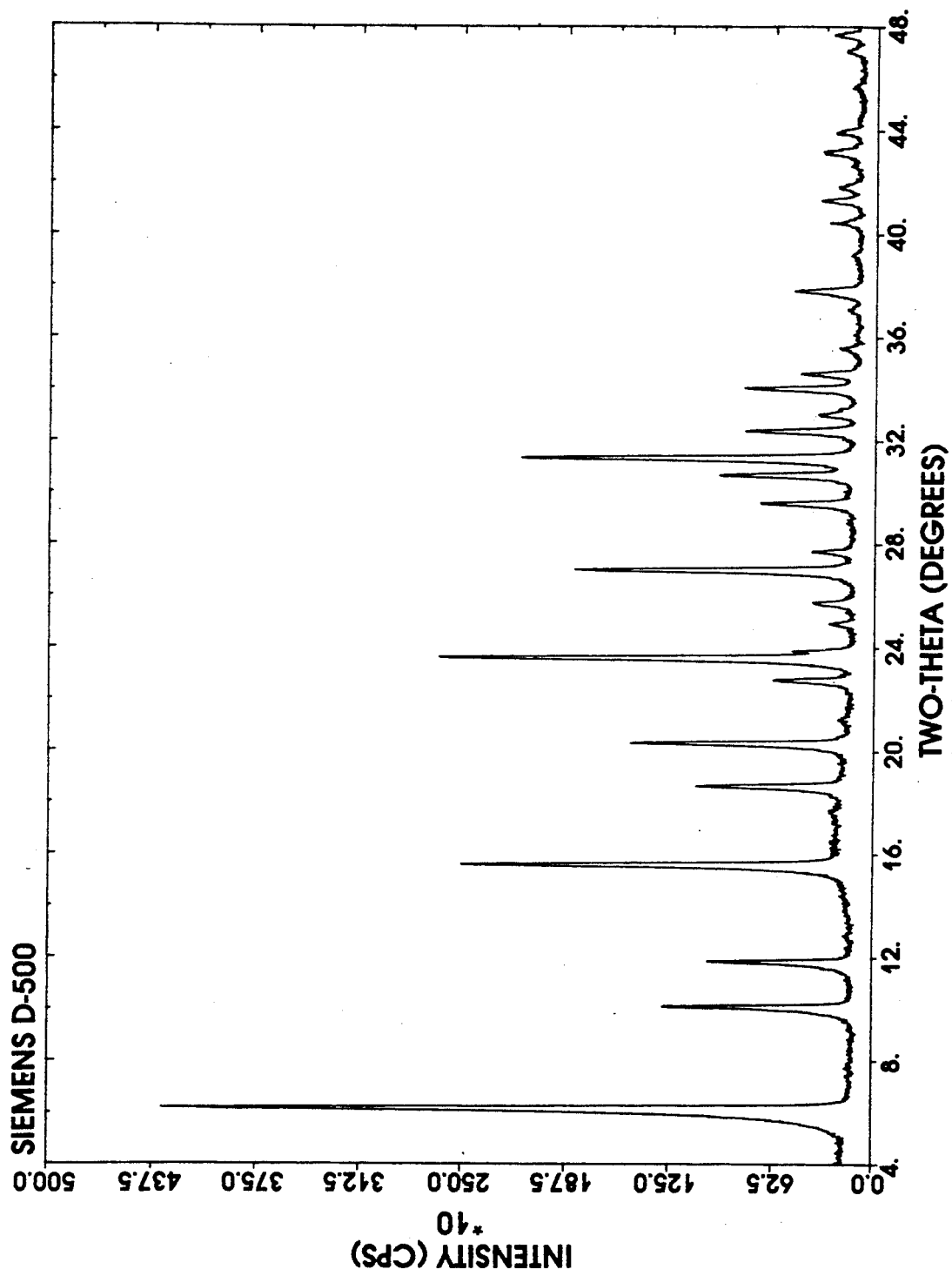
FIG. 2 depicts the X-ray powder diffraction pattern of a molecular sieve synthesized in accordance with the process of the invention as exemplified in Example 1.

An X-ray diffractogram of the crystals is obtained using a Siemens D-500 X-ray diffractometer with graphite-crystal monochromatized Cu-K alpha radiation. The resultant X-ray powder diffraction pattern is shown in FIG. 2 and the corresponding X-ray powder diffraction data including the calculated d-spacings are set forth in Table 3 below.

TABLE 3

X-Ray Powder Diffraction Data for the Crystalline Gallioaluminosilicate of Example 1

| Bragg Angle 2-Theta (Degrees) | Interplanar d-spacings (Angstroms) | Relative Intensity (100 × I/I$_o$) |
| --- | --- | --- |
| 6.171 | 14.3114 | 100.0 |
| 10.100 | 8.7511 | 27.9 |
| 11.856 | 7.4582 | 21.3 |
| 12.855 | 6.8811 | 1.5 |
| 15.616 | 5.6700 | 55.3 |
| 18.646 | 4.7550 | 21.8 |
| 20.322 | 4.3664 | 31.9 |
| 21.255 | 4.1768 | 1.7 |
| 22.760 | 3.9039 | 11.6 |
| 23.615 | 3.7645 | 60.0 |
| 24.965 | 3.5638 | 3.8 |
| 25.752 | 3.4567 | 6.2 |
| 26.994 | 3.3004 | 38.6 |
| 27.723 | 3.2153 | 5.8 |
| 29.587 | 3.0168 | 13.3 |
| 30.694 | 2.9104 | 18.0 |
| 31.344 | 2.8516 | 47.0 |

TABLE 3-continued

X-Ray Powder Diffraction Data for the
Crystalline Gallioaluminosilicate of Example 1

| Bragg Angle 2-Theta (Degrees) | Interplanar d-spacings (Angstroms) | Relative Intensity (100 × I/I$_o$) |
|---|---|---|
| 32.396 | 2.7613 | 16.2 |
| 33.030 | 2.7098 | 5.4 |
| 34.035 | 2.6320 | 15.9 |
| 34.612 | 2.5895 | 7.9 |
| 35.581 | 2.5211 | 3.2 |
| 37.079 | 2.4227 | 1.7 |
| 37.811 | 2.3774 | 9.9 |
| 39.212 | 2.2956 | 1.4 |
| 40.470 | 2.2271 | 5.1 |
| 41.327 | 2.1829 | 5.7 |
| 41.856 | 2.1565 | 3.1 |
| 42.663 | 2.1176 | 1.5 |
| 43.174 | 2.0937 | 5.5 |
| 43.945 | 2.0588 | 3.8 |
| 45.712 | 1.9832 | 1.7 |
| 47.078 | 1.9288 | 2.6 |

The X-ray powder diffraction pattern set forth in FIG. 2 is substantially similar to that set forth in FIG. 1 for a zeolite with the faujasite structure. Thus, it is concluded that the crystlaline gallioaluminosilicate synthesized in Example 1 has the faujasite structure.

EXAMPLE 2

Figure 3:
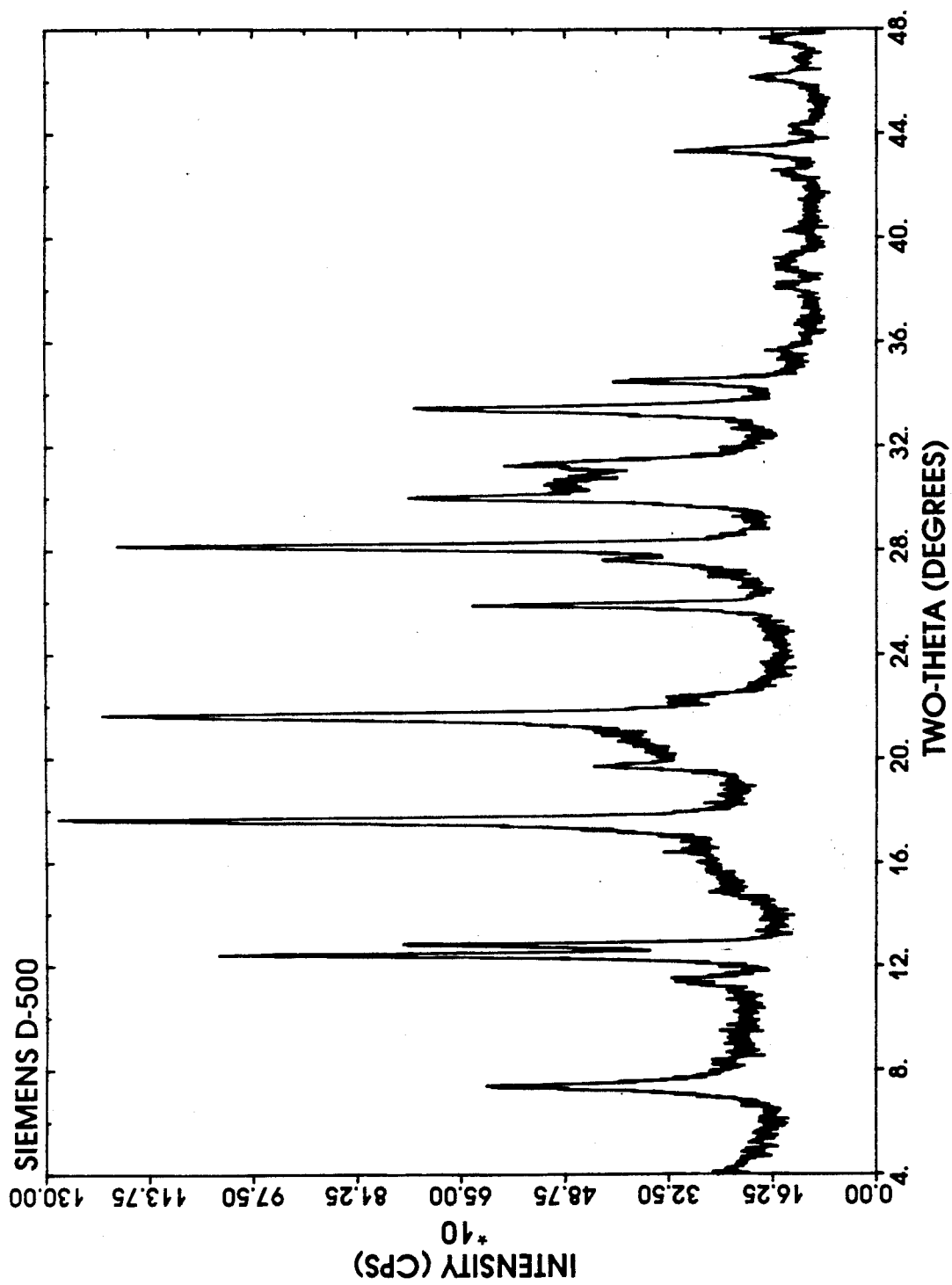
FIG. 3 shows the X-ray powder diffraction pattern of the molecular sieve synthesized in accordance with the process of Example 2.

A mixture of an aluminosilicate hydrogel and a galliosilicate solution is prepared as described in Example 1 except that, after the temperature of the mixture is raised to about 95° C., crystallization is allowed to occur while vigorously stirring the mixture. After 48 hours crystallization is completed. An X-ray diffractogram of the resultant crystals is obtained as described in Example 1. The resultant X-ray powder diffraction pattern is set forth in FIG. 3 and the corresponding X-ray powder diffraction data including the calculated d-spacings are set forth in Table 4 below. The X-ray powder diffraction pattern indicates the presence of a mixture of gallioaluminosilicates having the gmelinite and zeolite Pt structures. No gallioaluminosilicate with the faujasite structure was present. Thus, it is concluded that stirring or agitation during crystallization will result in the formation of gallioaluminosilicate molecular sieves that do not have the faujasite structure.

TABLE 4

X-Ray Powder Diffraction, Data for the
Crystalline Gallioaluminosilicates of Example 2

| Bragg Angle 2-Theta (Degrees) | Interplanar d-spacings (Angstroms) | Relative Intensity (100 × I/I$_o$) |
|---|---|---|
| 7.391 | 11.9605 | 40.0 |
| 8.219 | 10.7584 | 5.2 |
| 12.448 | 7.1110 | 67.3 |
| 12.842 | 6.8934 | 57.6 |
| 14.844 | 5.9679 | 6.8 |
| 17.654 | 5.0241 | 100.0 |
| 19.722 | 4.5015 | 15.6 |
| 21.645 | 4.1058 | 87.2 |
| 22.338 | 3.9799 | 6.9 |
| 25.882 | 3.4424 | 44.0 |
| 26.986 | 3.3041 | 6.8 |
| 27.630 | 3.2285 | 10.8 |
| 28.158 | 3.1692 | 87.2 |
| 30.021 | 2.9766 | 35.3 |
| 31.280 | 2.8596 | 22.5 |
| 33.437 | 2.6799 | 52.7 |
| 34.468 | 2.6021 | 24.5 |
| 35.655 | 2.5181 | 6.5 |
| 38.112 | 2.3612 | 6.7 |

TABLE 4-continued

X-Ray Powder Diffraction, Data for the
Crystalline Gallioaluminosilicates of Example 2

| Bragg Angle 2-Theta (Degrees) | Interplanar d-spacings (Angstroms) | Relative Intensity (100 × I/I$_o$) |
|---|---|---|
| 38.794 | 2.3213 | 4.2 |
| 42.548 | 2.1248 | 6.1 |
| 43.368 | 2.0865 | 21.5 |
| 44.022 | 2.0570 | 3.7 |
| 46.190 | 1.9654 | 10.3 |

EXAMPLE 3

A mixture of an aluminosilicate hydrogel and a galliosilicate solution is prepared as described in Example 1 except that the temperature of the mixture is raised from 95° C. to 110° C. before the mixture is allowed to crystallize without stirring. The crystallization rate is much faster than that observed in Example 1; the mixture is essentially crystalline after only 15 hours. An X-ray diffractogram of the resultant crystals is obtained as described in Example 1. The resultant X-ray powder diffraction pattern is essentially similar to the one set forth in FIG. 1, and it is concluded that the crystals have the faujasite structure.

EXAMPLE 4

An aluminosilicate hydrogel and a galliosilicate solution are prepared as described in Example 1 and mixed together in proportions such that the resulting mixture has the following composition expressed in terms of oxide mole ratios:

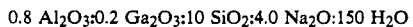

$0.8\ Al_2O_3:0.2\ Ga_2O_3:10\ SiO_2:4.0\ Na_2O:150\ H_2O$

As can be seen, the resultant hydrogel contains twice as much gallia as the mixture prepared in Example 1. The hydrogel is then heated and allowed to crystallize as described in Example 1. After about 72 hours, the hydrogel is essentially completely crystallized. An X-ray diffractogram of the resultant crystals is obtained as described in Example 1 and is similar to that shown in FIG. 1. Thus, it is concluded that the resultant crystalline gallioaluminosilicate has the faujasite structure.

EXAMPLE 5

A mixture of an aluminosilicate hydrogel and galliosilicate solution is prepared as described in Example 4 except that, after the temperature of the mixture is raised to about 95° C., crystallization is allowed to occur while vigorously stirring the mixture. Crystallization is essentially complete after about 72 hours. An X-ray diffractogram of the resultant crystals is obtained as described in Example 1 and indicates that the gallioaluminosilicate crystals have the gmelinite structure rather than the faujasite structure. Thus, as was the case in Example 2, it is concluded that stirring or agitation during crystallization results in the formation of a gallioaluminosilicate molecular sieve which does not possess the faujasite structure.

It will apparent from the foregoing that the invention provides a relatively simple and rapid method of synthesizing a crystalline, gallioaluminosilicate molecular sieve having the faujasite structure. Catalysts containing such a molecular sieve are useful in a variety of chemical conversion processes, particularly hydrocarbon conversion processes such as catalytic cracking, isomerization, and hydrocracking.

Although this invention has been primarily described in conjunction with examples and by reference to embodiments thereof, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

I claim:

1. A process for synthesizing a crystalline, gallioaluminosilicate molecular sieve having the faujastie structure and a silica-to-(alumina+gallia) mole ratio between 3 and about 10 which comprises:
   (a) mixing a substantially gallia-free aluminosilicate hydrogel having the following oxide mole ratios of components $SiO_2/Al_2O_3 = 6$ to 15

$Na_2O/Al_2O_3 = 1$ to 5

$H_2O/Al_2O_3 = 80$ to 500 with a galliosilicate solution substantially free of alumina, said solution having the following oxide mole ratios of components $Sio_2/Ga_2O_3 = 5$ to 30

$Na_2O/Ga_2O_3 = 6$ to 20

$H_2O/Ga_2O_3 = 200$ to 800 to form a mixture of said hydrogel and said solution, wherein said mixing is carried out by adding a sufficient amount of said galliosilicate solution to said aluminosilicate hydrogel so that said mixture of said solution and said hydrogel contains between about 1 and about 40 weight percent of said galliosilicate solution; and
   (b) crystallizing said mixture in the absence of substantial agitation to form a gallioaluminosilicate molecular sieve having the faujasite structure and a silica-to-(alumina+gallia) mole ratio between 3 and about 10, wherein said crystallization takes place in less than 3 days.

2. A process as defined by claim 1 wherein said aluminosilicate hydrogel is formed by dissolving sodium aluminate in an aqueous solution of sodium hydroxide and adding a source of silica thereto.

3. A process as defined in by claim 2 wherein said galliosilicate solution is formed by dissolving gallium oxide in a an aqueous solution of sodium hydroxide and adding a source of silica thereto.

4. A process as defined by claim 3 wherein the source of silica used in forming said aluminosilicate hydrogel and said galliosilicate solution comprises a silica sol.

5. A process as defined by claim 1 wherein said mixture is crystallized at a temperature between about 7020 C. and about 150° C.

6. A process as defined by claim 1 wherein said mixture is crystallized at a temperature between about 90° C. and 110° C.

7. A process for synthesizing a crystalline, gallioaluminosilicate molecular sieve having the faujasite structure and a silica-to-(alumina+gallia) mole ratio between 3 and about 10 which comprises:
   (a) mixing a source of alumina, a source of silica, a source of sodium and water to form an aluminosilicate hydrogel substantially free of gallia, said hydrogel having the following oxide mole ratios of components $SiO_2/Al_2O_3 = 6$ to 15

$Na_2O/Al_2O_3 = 1$ to 5

$H_2O/Al_2O_3 = 80$ to 500

(b) adding to said hydrogel a galliosilicate solution substantially free of alumina, said solution having the following oxide mole ratios of components $SiO_2/Ga_2O_3 = 5$ to 30

$Na_2O/Ga_2O_3 = 6$ to 20

$H_2O/Ga_2O_3 = 200$ to 800 to form a mixture of said solution and said hydrogel containing between about 1 and 40 weight percent of said galliosilicate solution, said mixture having the following oxide mole ratios of components $SiO_2/(Al_2O_3 + Ga_2O_3) = 5$ to 30

$Na_2O/(Al_2O_3 + Ga_2O_3) = 1$ to 5

$H_2O/(Al_2O_3 + Ga_2O_3) = 50$ to 500 wherein said galliosilicate solution is prepared by mixing a source of gallia, a source of silica, a source of sodium and water;
   (c) agitating said mixture at ambient temperature for between about one hour and two days after which time the temperature of said mixture is raised during agitation to between 90° C. and 150° C.; and
   (d) crystallizing said mixture in the absence of substantial agitation at a temperature between about 90° C. and 150° C. to form a gallioaluminosilicate molecular sieve having the faujasite structure and a silica-to-(alumina+gallia) mole ratio between 3 and about 10, wherein said crystallization takes place in less than 3 days.

8. A process as defined by claim 7 wherein said source of gallia comprises gallium oxide.

9. A process as defined by claim 7 wherein said source of sodium comprises sodium hydroxide.

10. A process as defined by claim 7 wherein said source of silica comprises a silica sol.

11. A process as defined by claim 7 wherein said source of alumina comprises aluminum oxide or sodium aluminate.

12. A process as defined by claim 7 wherein step (c) is carried out at a temperature between about 90° C. and about 110° C.

13. A process as defined by claim 7 wherein said $Na_2O/Ga_2O_3$ ratio in the solution of step (b) is between about 8 and about 15.

14. A process as defined by claim 7 wherein the aluminosilicate hydrogel formed in step (a) has the following oxide mole ratios of components $SiO_2/Al_2O_3 = 8$ to 12

$Na_2O/Al_2O_3 = 1$ to 5

$H_2O/Al_2O_3 = 100$ to 200.

15. A process as defined by claim 14 wherein the galliosilicate solution of step (b) has the following oxide mole ratios of components $SiO_2/Ga_2O_3 = 10$ to 20

$Na_2O/Ga_2O_3 = 8$ to 15

$H_2O/Ga_2O_3 = 300$ to 500.

16. A process as defined by claim 15 wherein the mixture of said aluminosilicate hydrogel and said galliosilicate solution has the following oxide mole ratios of components $SiO_2/(Al_2O_3 + Ga_2O_3) = 8$ to 15

$Na_2O/(Al_2O_3 + Ga_2O_3) = 2.5$ to 4.5

$H_2O/(Al_2O_3 + Ga_2O_3) = 100$ to 200.

17. A process as defined by claim 7 wherein said gallioaluminosilicate molecular sieve having the faujasite structure has the following composition expressed in terms of oxide mole ratios in the anhydrous state $aAl_2O_3:bGa_2O_3:cSiO_2:dNa_2O$ wherein a equals 0.5 to 0.99, b equals 0.01 to 0.5, c equals 3 to 7, d is approximately 1.0 and a+b equals 1.0.

18. A process of synthesizing a crystalline, gallioaluminosilicate molecular sieve having the faujasite structure ad a silica-to-(alumina+gallia) mole ratio between 3 and about 10 which consists essentially of:
 (a) mixing a substantially gallia-free aluminosilicate hydrogel having the following oxide mole ratios of components $SiO_2/Al_2O_3 = 6$ to 15

$Na_2O/Al_2O_3 = 1$ to 5

$H_2O/Al_2O_3 = 80$ to 500 with a galliosilicate solution substantially free of alumina, said solution having the following oxide mole ratios of components $SiO_2/Ga_2O_3 = 5$ to 30

$Na_2O/Ga_2O_3 = 6$ to 20

$H_2O/Ga_2O_3 = 200$ to 800 to form a mixture of said hydrogel and said solution, said mixture having the following oxide mole ratios of components $SiO_2/(Al_2O_3 + Ga_2O_3) = 5$ to 30

$Na_2O/(Al_2O_3 + Ga_2O_3) = 1$ to 5

$H_2O/(Al_2O_3 + Ga_2O_3) = 50$ to 500 wherein said mixing is carried out by adding a sufficient amount of said galliosilicate solution to said aluminosilicate hydrogel so that said mixture of said solution and said hydrogel contains between about 1 and 40 weight percent of said solution; and
 (b) crystallizing said mixture at a temperature between about 70° C. and about 150° C. in the absence of substantial agitation to form a gallioaluminosilicate molecular sieve having the faujasite structure nd a silica-to-(alumina+gallia) mole ratio between 3 and about 10, wherein said crystallization takes place in less than 3 days.

19. A process as defined by claim 18 wherein said gallioaluminosilcate molecular sieve having the faujasite structure has the following composition expressed in terms of oxide mole ratios in the anhydrous state $aAl_2O_3:bGa_2O_3:cSiO_2:dNa_2O$ wherein a equals 0.5 to 0.99, b equals 0.01 to 0.5, c equals 3 to 7, d is approximatley 1.0 and a+b equals 1.0.

20. A process as defined by claim 18 wherein step (b) is carried out at a temperature between about 90° C. and about 110° C.

21. A process as defined by claim 1 wherein said galioaluminosilicate molecular sieve having the faujasite structure has the following composition expressed in terms of oxide mole ratios in the anhydrous state $aAl_2O_3:bGa_2O_3:cSiO_2:dNa_2O$ wherein a equals 0.5 to 0.99, b equals 0.01 to 0.5, c equals 3 to 7, d is approximately 1.0 and a+b equals 1.0.

22. A process as defined by claim 1 wherein said crystallization takes place in less than about 2 days.

23. A process as defined by claim 1 wherein the silica-to-alumina mole ratio in said aluminosilicate hydrogel equals 8 to 12.

24. A process as defined by claim 23 wherein the silica-to-gallia mole ratio in said galliosilicate solution equals 10 to 20.

25. A process as defined by claim 1 wherein said crystalline, gallioaluminosilicate molecular sieve contains between about 10 and about 35 weight percent alumina.

26. A process as defined by claim 1 wherein said crystallization takes place in less than about 1 day.

27. A process as defined by claim 7 wherein said crystalline, gallioaluminosilicate molecular sieve contains between about 10 and about 35 weight percent alumina.

28. A process as defined by claim 7 wherein said crystallization takes place in less than about 2 days.

* * * * *

UNITED STATES PATENT AND TRADEMARK OFFICE
CERTIFICATE OF CORRECTION

PATENT NO. : 5,053,213
DATED : October 1, 1991
INVENTOR(S) : Mario L. Occelli

It is certified that error appears in the above-indentified patent and that said Letters Patent is hereby corrected as shown below:

Column 13, claim 5, line 60, change "7020" to
-- 70° --.

Column 15, claim 18, line 32, change "crystlaline" to
-- crystalline --.

Column 16, claim 18, line 15, change "nd" to -- and --;
claim 21, line 31, change "galioaluminosilicate"
to -- gallioaluminosilicate --.

Signed and Sealed this

Twenty-seventh Day of December, 1994

Attest:

BRUCE LEHMAN

*Attesting Officer*     *Commissioner of Patents and Trademarks*